(12) United States Patent
Kok et al.

(10) Patent No.: US 8,325,740 B2
(45) Date of Patent: Dec. 4, 2012

(54) UN-INTERRUPTED VOIP RADIO GATEWAY SERVICES THROUGH CLUSTERING

(75) Inventors: Foon Yew Kok, Singapore (SG); Wai Keong Chan, Singapore (SG); Satyananda Kumar Pidakala, Singapore (SG); Wing Yau Au Yeong, Singapore (SG)

(73) Assignee: St. Electronics (Info-Comm Systems) Pte. Ltd., Singapore (SG)

( * ) Notice: Subject to any disclaimer, the term of this patent is extended or adjusted under 35 U.S.C. 154(b) by 681 days.

(21) Appl. No.: 12/095,936

(22) PCT Filed: Dec. 15, 2005

(86) PCT No.: PCT/SG2005/000421
§ 371 (c)(1),
(2), (4) Date: Oct. 16, 2008

(87) PCT Pub. No.: WO2007/070009
PCT Pub. Date: Jun. 21, 2007

(65) Prior Publication Data
US 2009/0279516 A1    Nov. 12, 2009

(51) Int. Cl.
*H04L 12/28* (2006.01)
(52) U.S. Cl. ......... 370/401; 370/218; 370/220; 370/244
(58) Field of Classification Search .......... 370/216–228, 370/242–245, 400, 401
See application file for complete search history.

(56) References Cited

U.S. PATENT DOCUMENTS

| 6,631,416 | B2* | 10/2003 | Bendinelli et al. | 709/227 |
| 6,868,059 | B1 | 3/2005 | Jones et al. | |
| 6,928,576 | B2* | 8/2005 | Sekiguchi | 714/4.3 |
| 7,647,422 | B2* | 1/2010 | Singh et al. | 709/238 |
| 2004/0047345 | A1 | 3/2004 | Joseph et al. | |
| 2005/0195795 | A1* | 9/2005 | Aoki et al. | 370/351 |
| 2006/0221912 | A1* | 10/2006 | Olivier et al. | 370/338 |
| 2007/0019540 | A1* | 1/2007 | Biswas et al. | 370/217 |

FOREIGN PATENT DOCUMENTS

| GB | 2 411 074 A | 8/2005 |
| WO | 01/35579 A1 | 5/2001 |

OTHER PUBLICATIONS

Tamasi, L., Orincsay, D, et al., "Design of survivable VPN based VoIP networks", Design of Reliable Communication Networks, 2005. (DRCN 2005), Proceedings 5th International Workshop on Date : Oct. 16-19, 2005, Digital Object Identifier 10.1109/DRCN.2005.1563911, pp. 473-479.

(Continued)

*Primary Examiner* — Christopher Grey
(74) *Attorney, Agent, or Firm* — Sughrue Mion, PLLC (57) ABSTRACT

A voice-over-internet system and method is disclosed which comprises a gateway (40) and a separate remote gateway (50) which can each provide signals between a radio (12) and a user terminal (24) via the internet (22). If one of the gateways fails, the other gateway is able to take over the communication role. Data is synchronised between the gateways and a polling protocol is used to determine whether one of the gateways remains active or whether the other gateway should assume the active role.

11 Claims, 6 Drawing Sheets

OTHER PUBLICATIONS

Yu, W., "Peer-to-peer approach for global deployment of voice over IP service", Computer Communications and Networks. ICCCN 2003, Proceedings the 12th International Conference on Date: Oct. 20-22, 2003, Digital Object Identifier 10.1109/ICCCN.2003.1284157, pp. 109-114.

Tamasi, L, et al., "Design of Survivable VPN Based VoIP Networks," Design of Reliable Communication Networks, 2005. (DRCN 2005). Proceedings. $5^{th}$ International Workshops on Oct. 16-19, 2005, pp. 473-479. Digital Object Identifier 10.1109/DRCN.2005.1563911.

Yu, W., "Peer-to-Peer Approach for Global Deployment of Voice over IP Service," Computer Communications and Networks, 2003. ICCCN 2003. Proceedings. The $12^{th}$ International Conference on Oct. 20-22, 2003, pp. 109-114. Digital Object Identifier 10.1109/ICCCN.2003.1284157.

* cited by examiner

UN-INTERRUPTED VOIP RADIO GATEWAY SERVICES THROUGH CLUSTERING

FIELD OF THE INVENTION

The present invention relates to a voice-over-internet method and system.

BACKGROUND OF THE INVENTION

Voice-Over-Internet protocol (VoIP) is a method of enabling voice communications using the Internet as the audio transport medium. All devices wanting to participate in VoIP communications need to be able to be connected to the IP network. Since radios typically do not have an IP network interface, a VoIP radio gateway is used as an interface between the radios and the IP network. The VoIP radio gateway allows radio voice communications over the Internet by performing audio encoding, audio decoding and call signaling. Audio encoding is the process of converting the analog radio signal to a digital form which can be transmitted in a IP network. Audio decoding is the process of generating the analog signal from digital audio packet received from the IP network. Call signaling refers to the control data being exchanged between the operator console and the VoIP gateway to set up the radio call.

If the VoIP radio gateway fails, there will not be any connectivity between the IP network and the radios. This may not be a desirable situation for applications requiring uninterrupted radio communications. One approach to this problem is to design a VoIP radio gateway with very low failure rate. This low level failure rate can be achieved by incorporating redundant hardware components. However, designing a gateway with redundant hardware components will result in higher cost of design and manufacturing. Apart from the higher cost per gateway, this approach does not address the issue of survivability, in that the redundancies built in will still be lost if the entire gateway is being destroyed by a catastrophic event.

SUMMARY OF THE INVENTION

The object of the present invention is to provide a method and apparatus which address the above drawbacks.

The invention provides a voice-over-internet system comprising:
  a first gateway;
  a second gateway remote from the first gateway;
  a radio device for supplying a voice signal to the gateways; and
  a selecting device for communicating between the gateways to facilitate selection of one of the gateways to transmit the voice signal to the internet and then to a voice-over-internet protocol user terminal.

Thus, according to the invention, since the gateways are remote from one another, if one of the gateways should suffer a catastrophic event and become unusable, the other gateway can be used to supply the voice signal over the internet to the user terminal. The selection device can communicate with both gateways to determine the status of the gateways and whether they are operating and facilitate selection of one of the gateways to transmit the signal.

Preferably each gateway has a radio communication path connecting the gateway to the internet.

Preferably the selection device comprises a processor for determining whether one of the gateways is operating and the communication path associated with that gateway is therefore operating so that one of the gateways can be selected for supplying the voice signal to the internet.

Preferably one of the gateways is designated a master gateway and is selected by the selection device for transmitting the voice signal and the selection device enables that gateway to transmit the signal if the gateway is operative, and the selection device polls the master gateway to determine whether the master gateway is operative and if not, switches communication between the radio device and the internet to the other gateway.

Preferably the processor is for synchronising data between the gateways so that both gateways contain operational data so that if communication is changed from one gateway to another gateway, the another gateway includes the communication data required to continue the communication between the gateway and the terminal.

Preferably the processor is also for causing one of the gateways to request all operational data from the other gateway before the other of the gateways assumes a standby mode.

Preferably the processor is for determining which of the gateways is to be an active gateway and supply the communication by a virtual IP address which is to be owned by the active gateway.

Preferably the processor comprises a processor at each of the gateways.

The invention also provides a voice-over-internet communication method comprising:
  providing a first gateway;
  providing a second gateway remote from the first gateway;
  enabling a voice signal from a radio device to be supplied to both the first gateway and the second gateway; and
  communicating between the first gateway and the second gateway to determine the status of the gateways and for selecting one of the gateways to transmit the voice signal to the internet and then to the voice-over-internet protocol user terminal.

Preferably each gateway has a radio communication path connecting the gateway to the internet.

Preferably the user terminal connects to the gateways.

Preferably the gateway providing the communication to the terminal does so by using a virtual IP address owned by that gateway and if that gateway fails, the other gateway assumes active status by claiming ownership of the virtual IP address.

Preferably the gateways form a cluster and one of the gateways is an active gateway supplying the communication and the other gateway can insert into the cluster at any time to be in a standby mode without disrupting the active gateway's function. Thus, the gateways can provide continuous radio communication services by allowing a faulty gateway to be removed and a new gateway to be reinserted into the cluster without disruption.

Preferably the method further comprises designating one of the gateways a master gateway, and selecting that gateway to transmit the voice signal if that gateway is operative, and polling the master gateway to determine whether the master gateway is operative and if not, switching communication between the radio device and the internet to the other gateway.

Preferably the method further comprises synchronising data between the gateways by an active gateway of the gateways sending operational data to the other gateway when the other gateway is in standby mode.

Preferably, before a gateway assumes a standby mode, the gateway requests all operational data to be copied from the active gateway.

Preferably the data synchronisation is implemented by transmission of the data using the physical IP addresses of the gateways.

BRIEF DESCRIPTION OF THE DRAWINGS

A preferred embodiment of the invention will be described, by way of example, with reference to the accompanying drawings, in which.

DETAILED DESCRIPTION OF THE PREFERRED EMBODIMENT

Figure 1:
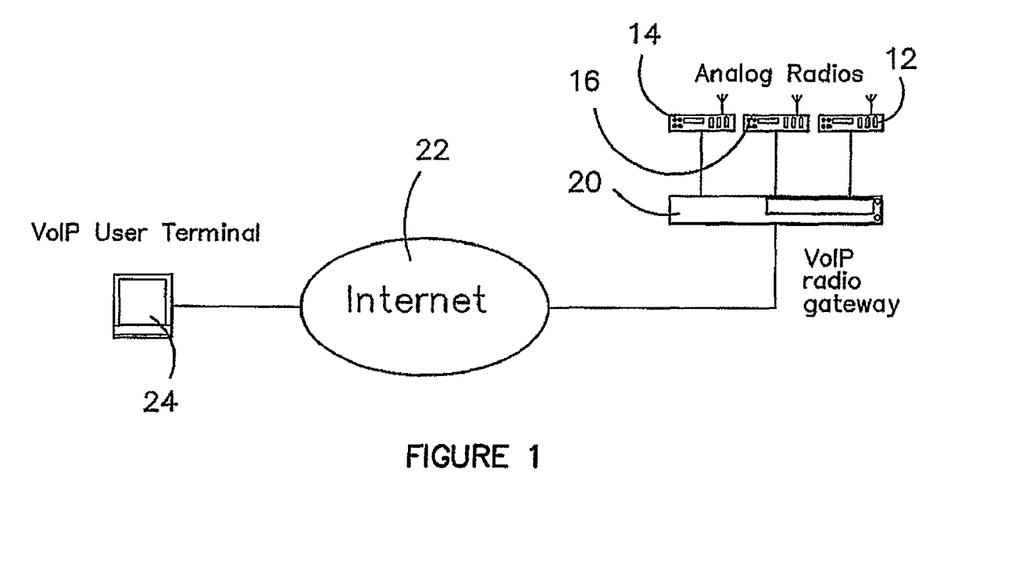
FIG. 1 is a diagram showing a conventional radio communication using VoIP gateway.

FIG. 1 is a diagram showing a conventional gateway system. In FIG. 1, radio devices 12, 14 and 16 are connected to a VoIP gateway 20 which in turn is connected to the internet 22 and via the internet 22 to a user terminal 24. The gateway 20 forms an interface between the radios 12-16 and the internet to enable voice signals to be transmitted over the internet. Should the gateway 20 fail, then obviously the voice signals cannot be transmitted to the internet 22 and the entire system fails.

Figure 2:
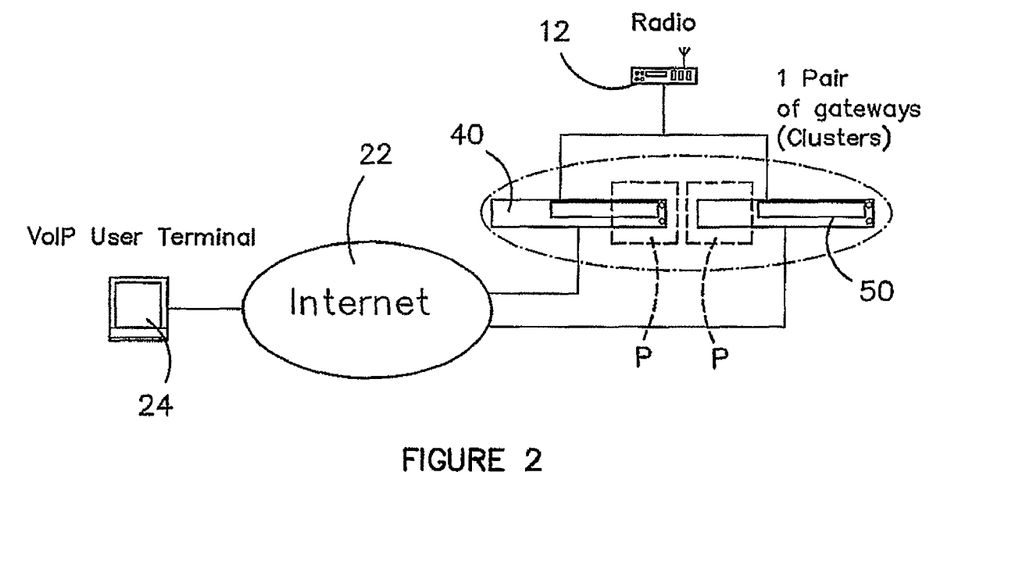
FIG. 2 is a diagram similar to FIG. 1 showing an embodiment of the present invention.

FIG. 2 is a diagram showing the preferred embodiment of the invention. In FIG. 2, only a single radio 12 is illustrated. The preferred embodiment has two gateways 40 and 50 which form a cluster and are separated from one another so one of the gateways 40 is remote from the other gateway 50. The gateways 40 and 50 are both connected to the internet 22 which in turn connects the radio 12 to user terminal 24. The gateways 40 and 50 have or are included in processors P (FIG. 2) which manages communication between the gateways 40 and 50. Thus, the gateways 40 and 50 need only be connected to the network infrastructures, such as the internet or some other network so that communication between the gateways 40 and 50 can taken place under the control of the processors P.

Figure 3:
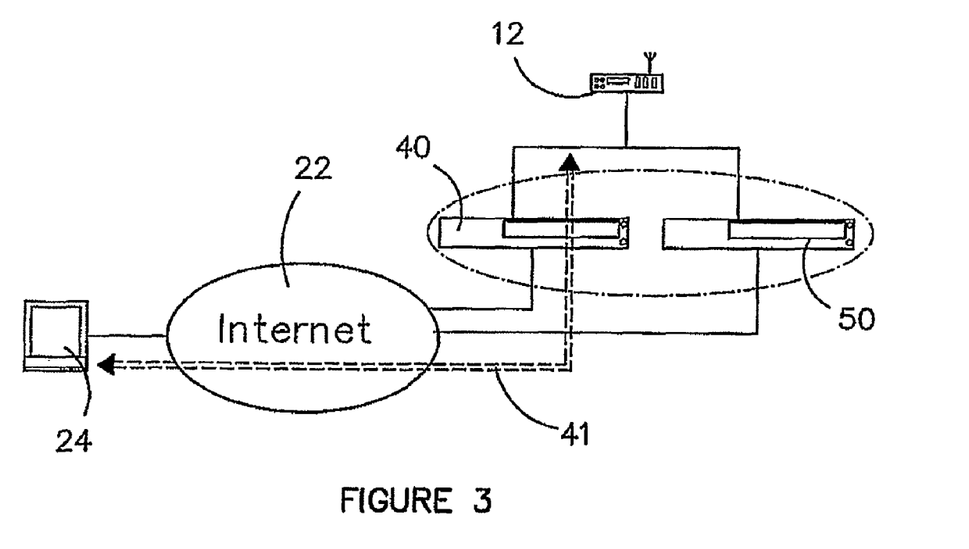
FIG. 3 is a view similar to FIG. 1 showing a radio communication path.

FIG. 3 shows the gateway 40 establishing a radio communication path 41 from the radio 12 to the terminal 24 via the internet 22.

Figure 4:
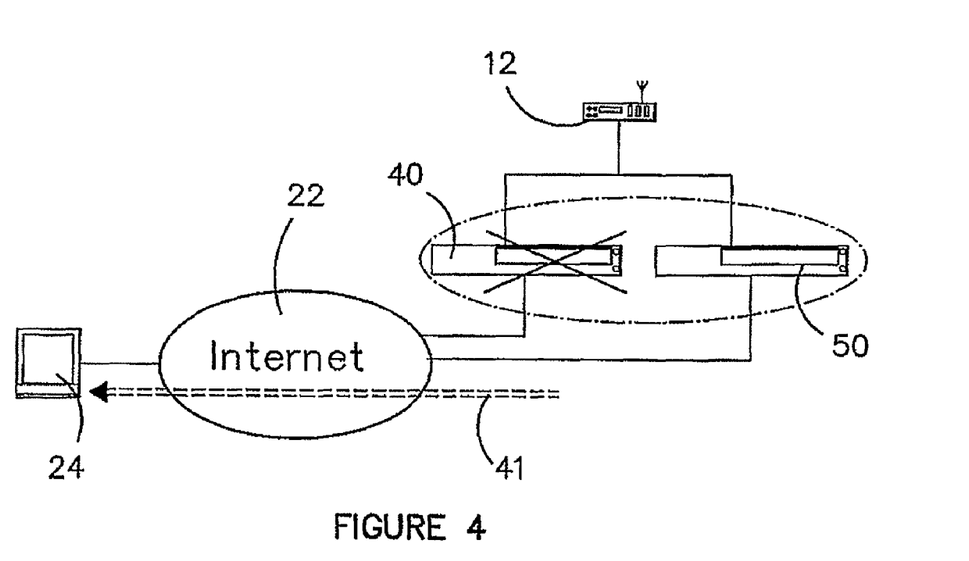
FIG. 4 is a view similar to FIG. 2 showing an alternative communication path.

FIG. 4 is a diagram illustrating the gateway 40 failing and the radio communication path 41 therefore becoming interrupted so signals cannot be transmitted from the gateway 40 from the radio 12.

Figure 5:
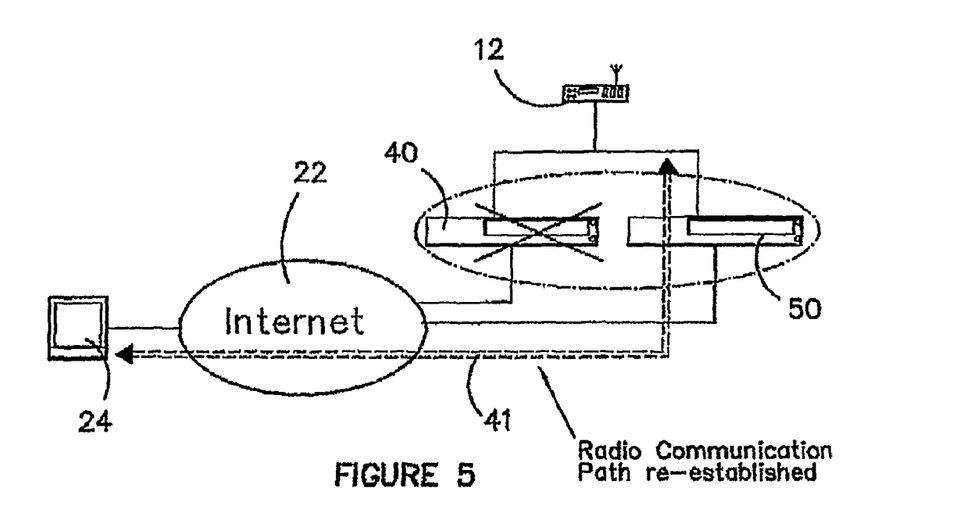
FIG. 5 shows communication through a standby gateway.

In FIG. 5 the radio communication path 41 is reestablished through the gateway 50 so that voice signals from the radio 12 can be transmitted to the user terminal 24.

Figure 6:
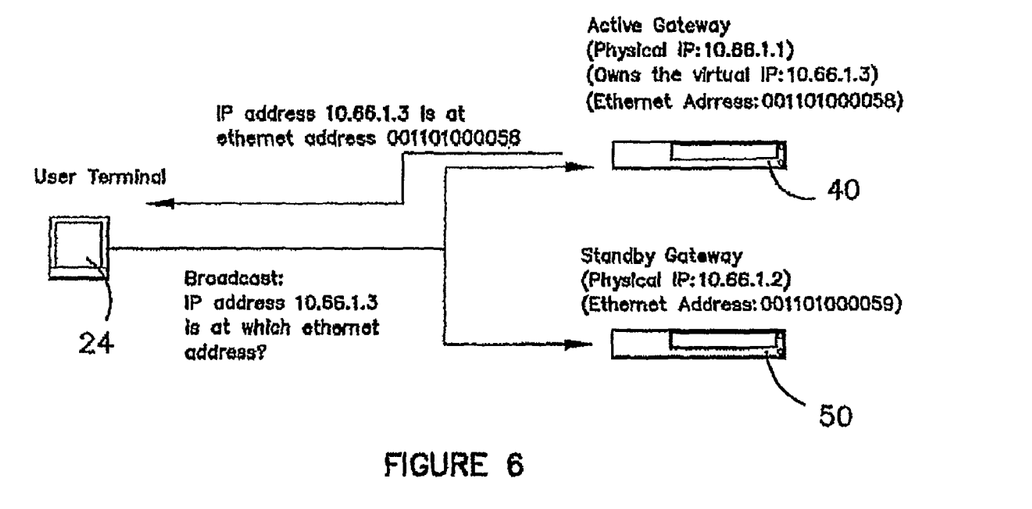
FIG. 6 is a diagram showing how one of the gateways is selected for transmitting a voice signal.

FIG. 6 is a diagram showing how one of the gateways is selected for transmitting the voice signal and selection of a gateway for that transmission. Thus, the clustered gateways 40 and 50 provide redundant communication paths from the radio 12 (not shown in FIG. 6) via the internet 22 (also not shown) to user terminal 24. In order for a user terminal to send voice data packets to the radio gateway, the destination ethernet address of the radio gateway's ethernet interface must be known. This ethernet address is obtained from the destination IP address through a standard process known as Address Resolution Protocol (ARP). The destination IP address used to obtain the ethernet address is known as the virtual IP address. The virtual IP address will be always be owned by the current active radio gateway. The term virtual IP is used because there are 2 physical gateways but only the current active gateway providing radio communication services owns the virtual IP. Regardless of which gateway is active, the user terminal will communicate with the radios via the virtual IP address.

In FIG. 6, the active radio gateway owns its own physical IP address (10.66.1.1) and the virtual IP address (10.66.1.3). The standby radio gateway owns only its physical IP address (10.66.1.2). The user terminal only identifies the radio gateway cluster by its virtual IP address. To obtain the destination ethernet address, it broadcasts a ARP (Address Resolution Protocol) request. Since only the active gateway owns the virtual IP, it responds by sending its own ethernet address to the user terminal. From this point onwards, the user terminal will send all its voice packets to ethernet address of the active gateway (001101000058).

The two gateways 40 and 50 inter-operate to determine which assumes the active status and which assumes the standby status. The active gateway is responsible for providing all the radio communication services. This selection process requires one of the gateway to be designated MASTER and the other SLAVE. The designation of MASTER and SLAVE is stored in a non-volatile memory (not shown) of the gateways 40 and 50. There is no requirement to assign a particular gateway to be MASTER. This embodiment only requires one gateway to be assigned MASTER designation and the other SLAVE designation if these two gateways are to be paired together.

The two gateways communicate with each other using their physical IP addresses to execute this selection protocol.

The active gateway selection protocol ensures the orderly way of determining which gateway can assume the active mode and claims the virtual IP address. The protocol starts when the gateway is powered-up.

Figure 7:
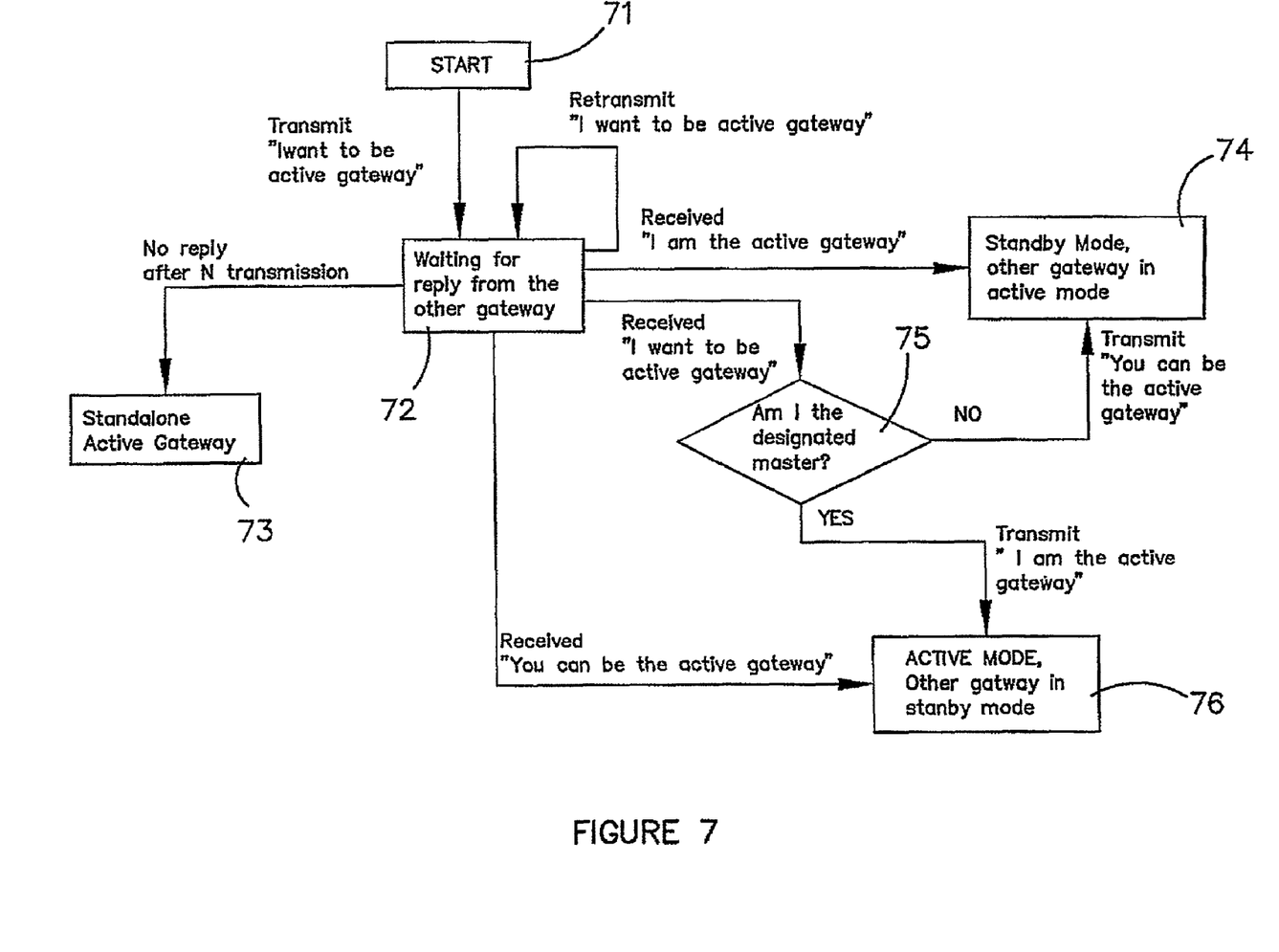
FIG. 7 is a block diagram showing operation of the preferred embodiment of the invention.

FIG. 7 is a block diagram showing the way of determining which gateway assumes the active mode and claims the virtual IP address. For the purpose of this example, it is assumed gateway 50 is the master.

At step 71, initial start-up takes place and the gateway (say gateway 50) which has just started up, sends a message "I want to be active gateway" to the other gateway 40. This message is retransmitted a plurality of times if no response is received (step 72). If there is no reply after N transmissions, the gateway 50 becomes the stand-alone active gateway, as per step 73. Thus, if no response is received from the other gateway 40, it is deemed to be out of service and the start-up gateway 50 can safely assume the active gateway status.

If the signal is received at step 72 back from the other gateway 40, indicating "I am the active gateway", the gateway 50 assumes the standby mode because the other gateway 40 is deemed to be in the active mode, as per step 74.

If at step 72 the other gateway 40 responds with a signal "I want to be active gateway", a decision is made at step 75 as to whether gateway 50 is the designated master gateway. If no, a signal is transmitted "You can be the active gateway", the gateway 50 goes to standby mode and the other gateway 40 is the active gateway, as per step 74. If the answer at step 75 is yes (as in this example), the master gateway 50 transmits a signal "I am the active gateway" and the gateway 50 assumes the active mode and the other gateway 40 is in the standby mode as per step 76.

When the designated master gateway 50 receives a "I want to be an active gateway" message, it will always deny the request with the "I am the active gateway" message after which it will assume the active state.

When the designated slave gateway 40 receives a "I want to be an active gateway" message, it will always grant the request with the "You can be the active gateway" message, after which it will assume the standby state.

The purpose of designating the master and slave status to the gateways is to ensure that one gateway (the master) can always be selected to be the active when both gateways request to assume active status at the same time. This scenario will arise when both gateways are powered up at the same time.

When a gateway assumes the active state, it will always remain in that state, providing all radio communication services through the virtual IP address. When it receives the message "I want to be active gateway", it will always deny the request with the message "I am the active gateway".

Figure 8:
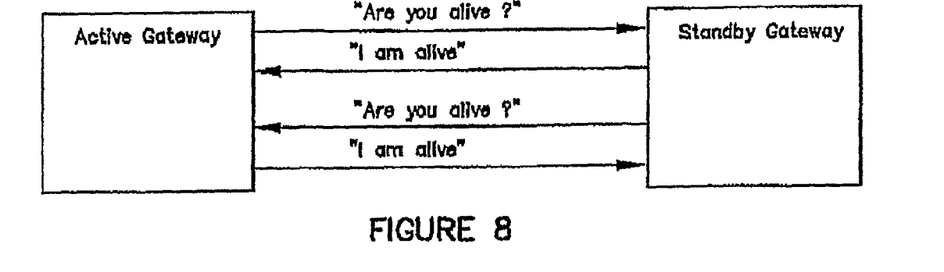
FIG. 8 is a diagram showing communication between the gateways to determine whether the other gateway is operating.

After the gateways assume the active or standby state, a heart beat process begins where the gateways will regularly poll each other for life signs. This heartbeat process is necessary for the standby gateway to determine if the active gateway has broken down. When the active gateway is deemed to have broken down, the standby gateway needs to initiate the take over process to claim the virtual IP address and assume the active role. To realize the heart beat process, the gateways send life-check data packet to each other using the physical IP addresses. The gateway shall respond to the life-check packet within a pre-configured time frame (M milli-seconds). If the gateway fails to respond within the designated time frame for N consecutive times, it is deemed to have failed and the sender will initiate the take over process. The values of M and N are configurable.

Factors affecting the choice of values for M

Network delay, need to provide sufficient time for life check data packet to reach the destination gateway and for reply data packet to reach heart beat sender.

Switch-over time. This is the time it should take for the standby gateway to completely assume the active status from the time that the former active gateway has broken down.

Factors affecting the choice of values for N

Network reliability, for a highly reliable network, the packet loss is low and hence N can be set to a smaller value Switch-over time. This is the time it should take for the standby gateway to completely assume the active status from the time that the former active gateway has broken down.

The time interval of sending the regular life-check message is dependent on the switch-over time requirement.

When the standby gateway is deemed to have broken down (Failed to respond to life-check message from the active gateway), the active gateway takes no action and will continue to provide the radio communication services.

In order for the radio gateway to provide radio communication services over the internet, it requires to maintain a set of operational information in the form of data in its read-only memory (RAM) (not shown). This set of data is required for the radio gateway to be able to maintain the user terminal's audio connections to the radios. For the standby gateway to be able to assume the role of the active gateway, it needs to have an exact copy of the operational data residing in the active gateway all the time. The copying of data from the active gateway to the standby gateway is termed as data synchronization.

Figure 9:
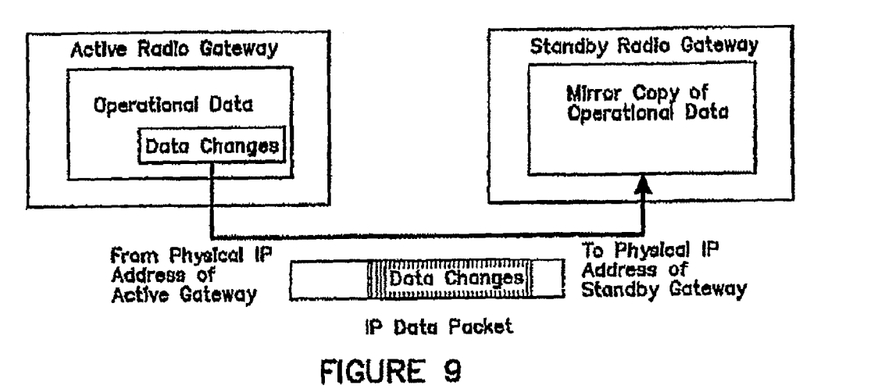
FIG. 9 is a diagram showing data synchronisation.
Figure 10:
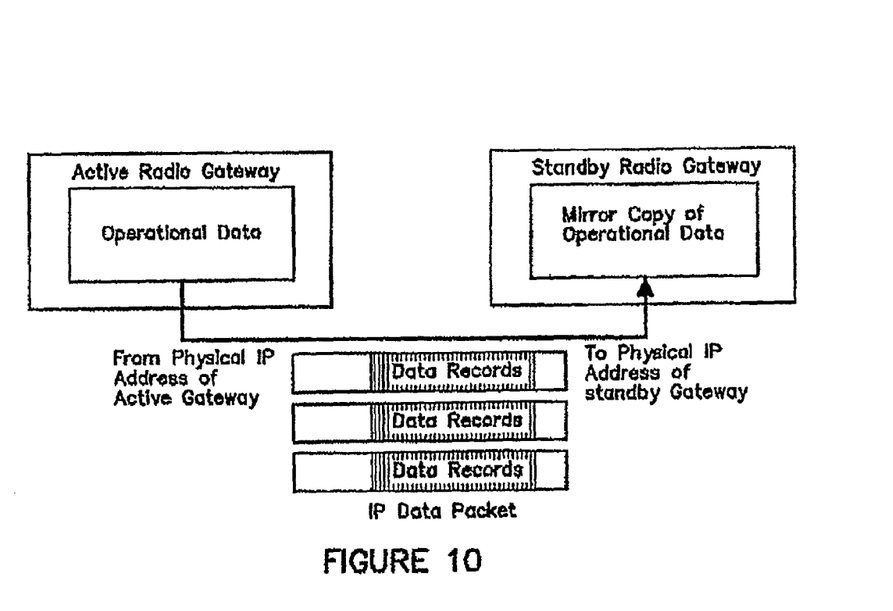
FIG. 10 is a diagram also showing data synchronisation.

Data synchronization occurs under two scenarios:

Scenario One: (See FIG. 9)

This scenario is when both gateways are already operating, one in active mode and the other in standby mode. Only changes in the operational data need to be sent from the active gateway to the standby gateway to maintain data synchronization.

Scenario Two: (See FIG. 10)

Radio gateway cluster is operating using a single standalone active gateway. When the other gateway in the cluster starts operating, it will be in standby mode. Before it can assume its role as standby gateway, it has to request for all operational data to be copied from the active gateway.

Data synchronization is implemented by transmission of the data using the physical IP addresses of the gateways.

A take-over procedure is executed when the heart beat process indicates that the current active gateway has become non-operational. The take-over procedure consists of:

Claiming ownership of the virtual IP address

Resuming radio communication services

The standby gateway assumes active mode by first claiming ownership of the virtual IP address. It will respond to all future Address-Resolution Protocol (ARP) request for ethernet address corresponding to the virtual IP address (See FIG. 11). It will also broadcast an unsolicited ARP reply (FIG. 12) so that all user terminals will be able to obtain the new ethernet address that they should be sending their IP packets to. When the standby gateway assumes the active mode, the user terminals will still be sending their data packets to the same virtual IP address, but to a different ethernet address, required for the alternative path to the radios.

Figure 11:
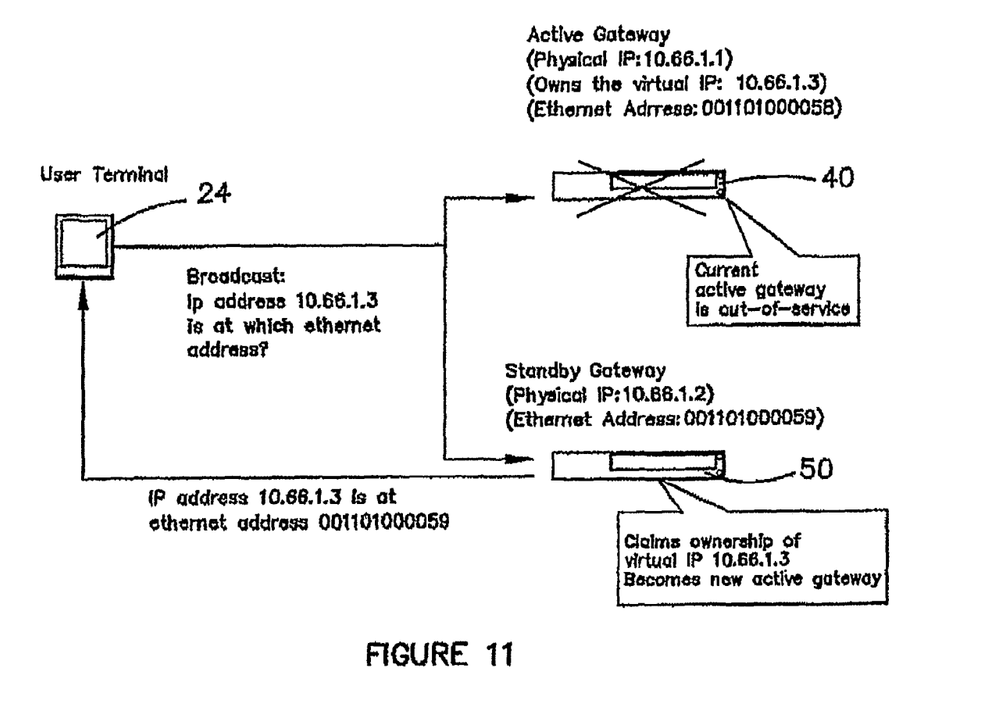
FIG. 11 is a diagram showing address takeover by one of the gateways.
Figure 12:
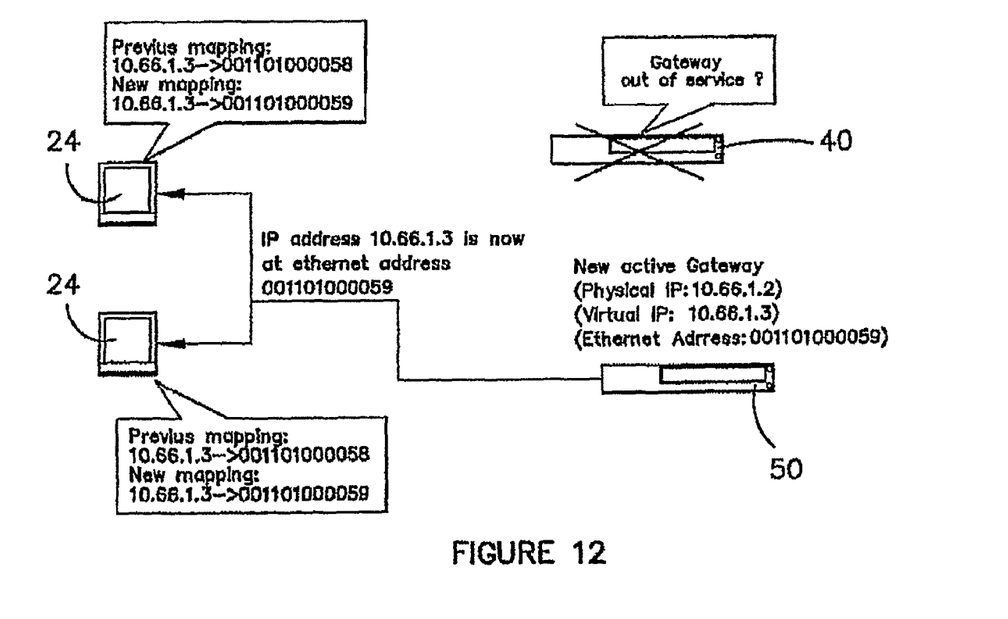
FIG. 12 is a diagram similar to FIG. 11 showing further details of the address takeover.

When the user terminal subsequently requests for ethernet address corresponding to the virtual IP address, the new active gateway will respond.

Once the new mapping between the virtual IP address and the ethernet address of the current active gateway (which has taken-over from the defunct gateway) is established, the redundant communication path to the radios is also established.

Before the standby gateway fully assumes active mode, it will re open all radio communication channels between the user terminals and the radio 12. From this point onwards, the radio communication between the user terminals and the radio 12 will resume.

Since modifications within the spirit and scope of the invention may readily be effected by persons skilled within the art, it is to be understood that this invention is not limited to the particular embodiment described by way of example hereinabove.

In the claims which follow and in the preceding description of the invention, except where the context requires otherwise due to express language or necessary implication, the word "comprise", or variations such as "comprises" or "comprising", is used in an inclusive sense, i.e. to specify the presence of the stated features but not to preclude the presence or addition of further features in various embodiments of the invention.

The invention claimed is:

1. A voice-over-internet system comprising:
  a pair of radio communication gateways comprising:
    a first gateway serving as a primary gateway and having a first physical IP address and a virtual IP address; and
    a second gateway remote from the first gateway serving as a secondary gateway and having a second physical address different from said first physical IP address;
  a radio device for supplying a voice signal and a control signal to the first and second gateways; and
  a selection mechanism for determining which of the first and second gateways is the gateway responsible for transmitting the voice signal to a voice-over-internet protocol user terminal and for handling call signalling via the internet, said selection mechanism being operative for communicating between the first and second gateways to facilitate selection of one of the first and second gateways to transmit the voice signal to the internet and then to a voice-over-internet protocol user terminal, and for synchronising data between the first and second gateways so that both the first and second gateways contain operational data so that if communication is changed from one gateway to another gateway, the another gateway includes the communication data required to permit the another gateway to perform the complete functionality of the one gateway after the another gateway becomes active and to continue the communication between the radio device and the user terminal,
  wherein each gateway has a radio path connecting the gateway to a user terminal via the internet,
  wherein, the first and second gateways communicate with each other via the internet, using physical IP addresses,
  wherein the selection mechanism comprises a processor in each of said primary gateway and said secondary gateway, each processor communicating with the other processor for determining whether the primary gateway is operating and whether a communication and call signalling path associated with that primary gateway is therefore operating so that one of the first and second gateways can be selected for supplying the voice signal from the radio device to the user terminal via a radio communication path through the internet and for handling call signalling,
  wherein, upon start up, a gateway asserts that it wishes to be the active gateway, and will be the active or standby gateway depending on (1) whether a reply is received from the other gateway within a predetermined period of time and (2) the nature of the reply,
  wherein, after start up, the processor in each gateway constantly polls the other gateway by sending a life check packet to the other gateway using the physical IP address and, if the other gateway fails to respond within a predetermined time frame M for N consecutive times, the other gateway is deemed to have failed, and
  wherein, if the primary gateway is thereby deemed by the standby gateway to have failed, the secondary gateway activate itself as the primary gateway to provide the communication and call signalling path between the radio device and the user terminal.

2. The system of claim 1 wherein the selection mechanism is for determining which of the gateways is to be an active gateway and supply communication using the virtual IP address which is to be owned by the active gateway, also for causing one of the gateways to request all operational data from the other gateway before the other of the gateways assumes a standby mode, and for allowing the active gateway to update the inactive gateway when there are changes to the operational data.

3. The system of claim 2 wherein the selection mechanism is for synchronizing the data between the primary and secondary gateways so that if the radio communication path is changed from one gateway to another, the other gateway has the necessary data to continue the communication between the radio device and the user terminal.

4. The system of claim 1 wherein each processor is for determining that its respective gateway is to assume the active role and to activate the communication and call singalling path between the radio device and the user terminal by taking ownership of the virtual IP address used by user terminal to connect to the gateway.

5. A voice-over-internet communication method comprising:
  providing a pair of radio gateways, each having a processor and a radio communication path connecting the gateway to the internet, including a first gateway as a primary gateway assigned a first physical IP address and a virtual IP address and a second gateway as a secondary gateway assigned a second physical IP address different from said first physical IP address;
  enabling a voice signal from a radio device to be supplied to both the first gateway and the second gateway;
  synchronising data between the gateways by an active gateway of the first and second gateways sending operational data to the other gateway when the other gateway is in standby mode; and
  communicating between the first gateway and the second gateway to determine the status of the gateways and for selecting one of the gateways as the active gateway to transmit the supplied voice signal to the internet and then to the voice-over-internet protocol user terminal
  whereby, both the active gateway and the other gateway contain operational data so that if communication is changed from the active gateway to the other gateway, the other gateway includes the communication data required to permit the other gateway to perform the complete functionality of the active gateway after the other gateway becomes active and to continue the communication between the radio device and the user terminal,
  wherein each of the first and second gateways has a radio path connecting the gateway to a user terminal via the internet,
  wherein, the first and second gateways communicate with each other via the internet, using physical IP addresses,
  wherein the selecting step is provided by a processor in each of said primary gateway and said secondary gateway, each processor communicating with the other processor for determining whether the primary gateway is operating and whether a communication and call signalling path associated with that primary gateway is therefore operating so that one of the first and second gateways can be selected for supplying the voice signal from the radio device to the user terminal via a radio communication path through the internet and for handling call signalling,
  wherein, upon start up, a gateway asserts that it wishes to be the active gateway, and will be the active or standby gateway depending on (1) whether a reply is received from the other gateway within a predetermined period of time and (2) the nature of the reply, wherein, after start up, each gateway constantly polls the other gateway by sending a life check packet to the other gateway using the physical IP address and, if the other gateway fails to respond within a predetermined time frame M for N consecutive times, the other gateway is deemed to have failed, and wherein, if the primary gateway is thereby deemed by the standby gateway to have failed, the secondary gateway activate itself as the primary gateway to provide the communication and call signalling path between the radio device and the user terminal.

6. The method of claim 5 wherein the active status is always assigned to the primary gateway when both gateways are operational upon start up.

7. The method of claim 5 wherein the gateway providing the communication to the terminal does so by using the virtual IP address owned by that gateway and if that gateway fails, the other gateway assumes active status by claiming ownership of the virtual IP address and wherein the primary or secondary gateway assumes an active status when it is unable to establish communication with the other gateway after a pre-defined time.

8. The method of claim 7 wherein the gateways form a cluster and one of the gateways is an active gateway supplying the communication and the other gateway can insert into the cluster at any time to be in a standby mode without disrupting the active gateway's function.

9. The method of claim 8 wherein the method further comprises synchronizing of operational data for the pair of gateways by the active gateway transmitting updated data to the standby gateway.

10. The method of claim 5 wherein before a gateway assumes a standby mode, the gateway requests all operational data to be copied from the active gateway.

11. The method of claim 10 wherein the data synchronisation is implemented by transmission of the data using the physical IP addresses of the gateways.

* * * * *